United States Patent
Mohammed et al.

(10) Patent No.: US 10,793,762 B2
(45) Date of Patent: Oct. 6, 2020

(54) LAYERED DOUBLE HYDROXIDES FOR OIL-BASED DRILLING FLUIDS

(71) Applicants: Saudi Arabian Oil Company, Dhahran (SA); Durham University, Durham (GB); M-I Drilling Fluids UK Ltd, Aberdeen (GB)

(72) Inventors: Musarrat Halima Mohammed, Glasgow (GB); Andrew Whiting, Durham (GB); Hugh Christopher Greenwell, County Durham (GB); Manohara Gudiyor Veerabhadrappa, Durham (GB); John Adrian Hall, Dhahran Hills (SA); Gasan Selman Alabedi, Cheshire (GB); Michael Hayward Hodder, Aberdeen (GB)

(73) Assignees: Saudi Arabian Oil Company, Dhahran (GB); Durham University, Durham (GB); M-I Drilling Fluids UK Ltd, Aberdeen (GB)

( * ) Notice: Subject to any disclaimer, the term of this patent is extended or adjusted under 35 U.S.C. 154(b) by 30 days.

(21) Appl. No.: 16/057,378

(22) Filed: Aug. 7, 2018

(65) Prior Publication Data
US 2019/0055451 A1   Feb. 21, 2019

Related U.S. Application Data

(60) Provisional application No. 62/545,673, filed on Aug. 15, 2017.

(51) Int. Cl.
*C09K 8/36* (2006.01)
*E21B 21/00* (2006.01)

(52) U.S. Cl.
CPC .............. *C09K 8/36* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 22,848 A | 2/1859 | Saml | |
| 2,520,551 A | 8/1950 | Kilgore | |
| 3,125,517 A | 3/1964 | Voda | |
| 3,166,548 A | 1/1965 | Kirkpatrick et al. | |
| 3,539,518 A | 11/1970 | Feighner et al. | |

(Continued)

FOREIGN PATENT DOCUMENTS

| CA | 2057024 A1 | 11/1990 |
|---|---|---|
| CN | 103032056 A | 4/2013 |

(Continued)

OTHER PUBLICATIONS

Office Action dated Sep. 20, 2019 pertaining to U.S. Appl. No. 16/055,881, filed Aug. 6, 2018, 28 pgs.

(Continued)

*Primary Examiner* — Anuradha Ahuja
(74) *Attorney, Agent, or Firm* — Dinsmore & Shohl

(57) ABSTRACT

A drilling fluid and a method of preparing the drilling fluid. The oil-based drilling fluid includes a base oil continuous phase comprising a base oil, an aqueous dispersed phase and at least one rheology modifier. The at least one rheology modifier includes a magnesium/aluminum (Mg/Al) layered-double hydroxide (LDH) diamondoid compound.

19 Claims, 2 Drawing Sheets

(56) References Cited

U.S. PATENT DOCUMENTS

| | | | |
|---|---|---|---|
| 3,600,121 A | 8/1971 | Feldmann | |
| 3,676,344 A | 7/1972 | Kuceski | |
| 3,723,393 A | 3/1973 | Kistner | |
| 3,728,277 A | 4/1973 | Foley | |
| 4,368,276 A | 1/1983 | Park | |
| 4,374,737 A | 2/1983 | Larson et al. | |
| 4,478,281 A | 10/1984 | Blazer et al. | |
| 4,501,672 A | 2/1985 | Connell et al. | |
| 4,664,843 A * | 5/1987 | Burba, III | B82Y 30/00 |
| | | | 516/110 |
| 4,749,563 A | 6/1988 | Georgalas | |
| 4,766,153 A | 8/1988 | Casciani | |
| 4,776,966 A | 10/1988 | Baker | |
| 5,079,203 A * | 1/1992 | Pinnavaia | B01D 53/864 |
| | | | 502/80 |
| 5,094,778 A * | 3/1992 | Burba, III | B82Y 30/00 |
| | | | 252/184 |
| 5,196,143 A * | 3/1993 | Burba, III | B82Y 30/00 |
| | | | 252/184 |
| 5,250,727 A | 10/1993 | Fried | |
| 5,325,922 A * | 7/1994 | Cowan | E21B 21/003 |
| | | | 166/292 |
| 5,709,976 A | 1/1998 | Malhotra | |
| 5,869,433 A | 2/1999 | Patel | |
| 5,874,024 A | 2/1999 | Knaus | |
| 6,172,151 B1 | 1/2001 | Johnston et al. | |
| 6,242,389 B1 | 6/2001 | Elliott et al. | |
| 6,365,639 B1 * | 4/2002 | Hoy | B01J 13/0078 |
| | | | 252/184 |
| 6,395,686 B2 | 5/2002 | Crawford | |
| 6,437,031 B1 | 8/2002 | Lensvelt et al. | |
| 6,475,959 B1 | 11/2002 | Lange et al. | |
| 6,537,662 B1 | 3/2003 | Kamrath et al. | |
| 6,878,198 B1 | 4/2005 | Drappel et al. | |
| 6,894,007 B2 | 5/2005 | Klug et al. | |
| 7,098,351 B2 | 8/2006 | Hoong et al. | |
| 7,278,726 B2 | 10/2007 | Nagai | |
| 7,507,694 B2 | 3/2009 | Shumway et al. | |
| 7,741,248 B2 | 6/2010 | Mueller et al. | |
| 8,071,510 B2 | 12/2011 | Scoggins et al. | |
| 8,501,807 B2 | 8/2013 | You et al. | |
| 9,222,013 B1 | 12/2015 | Champagne et al. | |
| 9,315,621 B2 | 4/2016 | Chen et al. | |
| 9,815,222 B2 * | 11/2017 | James | C07F 15/06 |
| 2002/0009564 A1 | 1/2002 | Hall et al. | |
| 2002/0039666 A1 | 4/2002 | Nakamura | |
| 2003/0009834 A1 | 1/2003 | Ascione et al. | |
| 2003/0130132 A1 | 7/2003 | Grainger et al. | |
| 2003/0130135 A1 | 7/2003 | Hou et al. | |
| 2004/0038892 A1 | 2/2004 | Finn et al. | |
| 2005/0048024 A1 | 3/2005 | Looker et al. | |
| 2006/0035999 A1 | 2/2006 | Bedford et al. | |
| 2006/0068086 A1 | 3/2006 | Reece et al. | |
| 2006/0088657 A1 | 4/2006 | Reece et al. | |
| 2006/0293192 A1 | 12/2006 | Lochel et al. | |
| 2007/0034825 A1 | 2/2007 | Wenderoth et al. | |
| 2007/0049500 A1 | 3/2007 | Mueller et al. | |
| 2007/0100040 A1 | 5/2007 | Chen et al. | |
| 2007/0116909 A1 | 5/2007 | Tweed et al. | |
| 2007/0140957 A1 | 6/2007 | Mohanty et al. | |
| 2007/0227404 A1 * | 10/2007 | Plank | C09K 8/16 |
| | | | 106/694 |
| 2008/0170978 A1 | 7/2008 | Duan et al. | |
| 2008/0182468 A1 | 7/2008 | Dharmarajan et al. | |
| 2010/0056647 A1 | 3/2010 | Graham et al. | |
| 2010/0279848 A1 | 11/2010 | Iyi et al. | |
| 2011/0076607 A1 | 3/2011 | Sugimoto et al. | |
| 2012/0067575 A1 | 3/2012 | Luyster et al. | |
| 2012/0129735 A1 | 5/2012 | Dino et al. | |
| 2012/0322694 A1 * | 12/2012 | Monteiro | C09K 8/032 |
| | | | 507/105 |
| 2012/0325748 A1 | 12/2012 | Kasher et al. | |
| 2013/0035412 A1 | 2/2013 | Schmitz et al. | |
| 2013/0045898 A1 | 2/2013 | Witters et al. | |
| 2013/0267445 A1 | 10/2013 | Hendrickson | |
| 2014/0081045 A1 | 3/2014 | Reddington et al. | |
| 2014/0121135 A1 | 5/2014 | Gamage et al. | |
| 2014/0228269 A1 | 8/2014 | Masui et al. | |
| 2014/0231145 A1 | 8/2014 | Kverel et al. | |
| 2014/0255378 A1 | 9/2014 | Watkins et al. | |
| 2014/0284057 A1 | 9/2014 | Champagne et al. | |
| 2014/0329088 A1 | 11/2014 | Friedman et al. | |
| 2014/0338911 A1 | 11/2014 | Dismuke et al. | |
| 2015/0068755 A1 | 3/2015 | Hill et al. | |
| 2015/0175880 A1 * | 6/2015 | Parris | C09K 8/62 |
| | | | 166/308.2 |
| 2015/0210914 A1 | 7/2015 | Muller et al. | |
| 2015/0361325 A1 | 12/2015 | Kimura et al. | |
| 2015/0376490 A1 | 12/2015 | Dino et al. | |
| 2016/0031910 A1 | 2/2016 | Maury et al. | |
| 2016/0096989 A1 | 4/2016 | Ngantung et al. | |
| 2016/0138349 A1 | 5/2016 | Hale et al. | |
| 2017/0037296 A1 | 2/2017 | Kimura et al. | |
| 2017/0044421 A1 | 2/2017 | Parvulescu et al. | |
| 2017/0081580 A1 * | 3/2017 | Maghrabi | C09K 8/36 |
| 2019/0053993 A1 | 2/2019 | Wilson et al. | |
| 2019/0055446 A1 | 2/2019 | Al Batal et al. | |
| 2019/0055447 A1 | 2/2019 | Al Batal et al. | |
| 2019/0055460 A1 | 2/2019 | Mohammed et al. | |

FOREIGN PATENT DOCUMENTS

| | | |
|---|---|---|
| CN | 105623629 A | 6/2016 |
| EP | 396983 A1 | 11/1990 |
| EP | 839850 A2 | 5/1998 |
| EP | 0906969 A1 | 9/1998 |
| EP | 945244 A1 | 9/1999 |
| JP | H022848 A | 1/1990 |
| RU | 2231534 C2 | 6/2004 |
| WO | 9523823 A1 | 9/1995 |
| WO | 0012458 A1 | 3/2000 |
| WO | 01/49406 A1 | 7/2001 |
| WO | 2004069240 A2 | 8/2004 |
| WO | 2014052510 A1 | 4/2014 |
| WO | 2014102602 A2 | 7/2014 |
| WO | 2015174974 A1 | 11/2015 |
| WO | 2016141968 A1 | 9/2016 |
| WO | 2017055789 A2 | 4/2017 |

OTHER PUBLICATIONS

Office Action dated Sep. 20, 2019 pertaining to U.S. Appl. No. 16/055,867, filed Aug. 6, 2018, 28 pgs.
Office Action dated Sep. 19, 2019 pertaining to U.S. Appl. No. 16/059,558, filed Aug. 9, 2018, 28 pgs.
Office Action dated Sep. 19, 2019 pertaining to U.S. Appl. No. 16/059,550, filed Aug. 9, 2018, 29 pgs.
Search Report pertaining to International Patent Application PCT/US2018/046204 dated Oct. 31, 2018.
Search Report pertaining to International Patent Application PCT/US2018/046009 dated Oct. 31, 2018.
Search Report pertaining to International Patent Application PCT/US2018/045569 dated Oct. 25, 2018.
Search Report pertaining to International Patent Application PCT/US2018/045907 dated Nov. 27, 2018.
Costantino U. et al. "Preparation and characterization of hydrotalcite/carboxyadamantane intercalation compounds as fillers of polymeric nanocomposites" Journal of Materials Chemistry, Dec. 22, 2006, pp. 1079-1086, vol. 17, No. 11.
International Search Report and Written Opinion pertaining to International Patent Application PCT/US2018/046220 dated Nov. 27, 2018.
International Search Report and Written Opinion dated Dec. 20, 2018 pertaining to International Patent Application PCT/US2018/046226.
International Search Report and Written Opinion dated Oct. 24, 2018 pertaining to International Patent Application PCT/US2018/045765.
Abdo, et al., "Clay nanoparticles modified drilling fluids for drilling of deep hydrocarbon wells", Applied Clay Science, vol. 86, pp. 76-82, 2013.

(56) References Cited

OTHER PUBLICATIONS

Abdou, et al., "Evaluation of Egyptian bentonite and nano-bentonite as drilling mud", Egyptian Journal of Petroleum, vol. 22, pp. 53-59, 2013.
Al-Salihi, "Synthesis of layered double hydroxide and their application in DSC", International Journal of Scientific & Engineering Research, vol. 7, Issue 1, pp. 694-698, Jan. 2016.
Askinadze et al., "Engineering of new crosslinked functional PEG micrometer-sized particles of narrow size distribution for enzyme immobilization", Polymer 54, pp. 2926-2934, 2013.
Ayawei et al., "Synthesis, Characterization and Application of Mg/Al Layered Double Hydroxide for the Degration of Congo Red in Aqueous Solution", Open Journal of Physical Chemistry, vol. 5, pp. 55-70, 2015.
Baruah et al., "The effect of particle size of clay on the viscosity build up property of mixed metal hydroxides (MMH) in the low solid-drilling mud compositions", Applied Clay Science, 80-81, pp. 169-175, 2013.
Dardir et al., "Preparton and evaluation of some esteramides as synthetic based drilling fluids", Egyptian Journal of Petroleum, vol. 23, pp. 35-43, 2014.
Dyer et al., "Synthesis and Structure of Phophatidylinositol Dimannoside", J. Org. Chem., vol. 72, pp. 3282-3288, 2007.
Eissa et al., "Synthesis of nonionic polymeric surfactants with amide oxime terminal groups", Journal of Basic and Environmental Sciences 4, pp. 94-106, 2017.
Fruijtier-Polloth, "Safety assessment on polyethylene glycols (PEGs) and their derivatives as used in cosmetic products", Toxicology 214, pp. 1-38, 2005.
Gluz et al., "Synthesis and characterization of new poly(ethylene glycol)bisphosphonate vinylic monomer and non-fluorescent and NIR-fluorescent bisphosphonate micrometer-sized particles", Polymer 54, pp. 565-571, 2013.
Growcock et al., "The Revolution in Non-Aqueous Drilling Fluids", AADE-11-NTCE-33, presentation at the 2011 AADE National Technical Conference and Exhibition, 2011.
Hermoso, et al., "Influence of viscosity modifier nature and concentratio non the viscous flow behaviour of oil-based drilling fludis at high pressure", Applied Clay Science 87, pp. 14-21, 2014.
Li, et al., "A new type of whole oil-based drilling fluid", Petroleum Exploration and Development, vol. 41, Issue 4, Aug. 2014.
Kim et al., "Thermal Evolution of the Structure of a Mg-Al-Co3 Layered Double Hydroxide: Sorption Reversibility Aspects", Ind. Eng. Chem. Res, vol. 43, pp. 4559-4570, 2004.
Krauss, et al., "Synthesis and Biological Evaluation of New Niphathesine Analogues", Arch. Pharm. Chem. Life Sci., 340, pp. 154-158, 2007.
Li, et al., "Rheological properties of hydrotalcite-like compounds/montmorillonite suspensions", Colloids and Surfaces A: Physichochem. Eng. Aspects, 304, pp. 14-17, 2007.
Liyi et al., "Effect of Gas Hydrate Drilling Fluids Using Low Solid Phase Mud System in Plateau Permafrost", Procedia Engineering 73, pp. 318-325, 2014.
Mao et al., "Hydrophobic associated polymer based silica nanoparticles composite with core-shell structure as a filtrate reducer for drilling fluid at ultra-high temperature", Journal of Petroleum Science and Engineering 129, pp. 1-14, 2015.
Mizrahi et al., "Novel Poly(ethylene glycol) Monomers Bearing Diverse Functional Groups", j. Polym. Sci., Part A: Polym. Chem. 48, pp. 5468-5478, 2010.
Ning et al., "Gas-hydrate formation, agglomeration and inhibition in oil-based drilling fluids for deep-water drilling", Journal of Natural Gas Chemistry 19, pp. 234-240, 2010.
Pivnicka et al., "Pressure gradient prediction of time-dependent drilling fluids and the effect of acceleration", Journal of Petroleum Science and Engineering 135, pp. 246-252, 2015.
Sakai et al., "Quaternary Ammonium-Type Gemini Surfactants Synthesized from Oleic Acid: Aqueous Solution Properties and Adsorption Characteristics", Journal of Oleo Science, vol. 62, No. 7, pp. 489-498, 2013.

Strachan, "Developing a High-Performance Oil-Base Fluid for Exploration Drilling", Oilfield Review Spring, vol. 26, No. 1, pp. 26-33, 2014.
Stanimirova et al., "Thermal evolution of Mg-Al-CO3 hydrotalcites", Clay Materials, vol. 39, pp. 177-191, 2004.
Tang, Boric Acid Catalyzed Amide Formation From Carboxylic Acids and Amines: N-Benzyl-4-Phenylbutyramide (Benzenbutanamide, N-(phenylmethyl)-), Organic Syntheses, vol. 81, pp. 262-272, 2005.
Traverso-Soto et al., "Distribution of anionic and nonionic surfactants in a sewage-impacted Mediterranean costal lagoon: Inputs and seasonal variations", Science of the Total Environment 503-504, pp. 87-96, 2015.
Vandevoorde et al., "Modifications of the Ethanolamine Head in N-Palmitoylethanolamine: Synthesis and Evaluation of New Agents Interfering with the Metabolism of Anandamide", J. Med. Chem. 46, pp. 1440-1448, 2003.
Vinardell et al., "The relationship between the chain length of non-ionic surfactants and their hemolytic action on human erythrocytes", Comparative Biochemistry and Physiology Part C 124, pp. 117-120, 1999.
Veronese et al., "The Impact of PEGylation of Biological Therapies", Buidrugs, vol. 22, Issue 5, pp. 315-329, 2008.
Wang et al., "New synthetic route to Mg-Al-CO3 layered double hydroxide using magnesite", Materials Research Bulletin 48, pp. 1228-1232, 2013.
Ying, "Fate, behavior and effects of surfactants and their degration products in the environment", Environment International 32, pp. 417-431, 2006.
Yldrim, "Metallic magnesium: an efficient catalyst toward N-aryl and N-alkyl substituted amides directly from aliphatic carboxylic acids", Monatsch Chem 146, pp. 947-951, 2015.
Zamanian et al., "Layered double hydroxides intercalated by long chain anions as oil phase gelling agent", Indian Journal of Chemical Technology, vol. 23, pp. 485-490, Nov. 2016.
Zhong et al., "Synergistic stabilization of shale by a mixture of polyamidomaine dendrimers modified bentonite with various generations in water-based drilling fluid", Applied Clay Science 114, pp. 359-369, 2015.
Zhuang et al., "Comparative study on the use of cationic-nonionic-organo-montmorillonite in oil-based drilling fluids", Applied Clay Science 1160117, pp. 257-262, 2015.
Search Report pertaining to International Patent Application PCT/US2018/045927 dated Oct. 30, 2018.
Notice of Allowance and Fee(s) Due dated Apr. 15, 2020 pertaining to U.S. Appl. No. 16/059,558, filed Aug. 9, 2018, 17 pgs.
Examination Report dated Dec. 28, 2019 pertaining to GCC Application No. 2018-35835, filed Aug. 14, 2018, 3 pgs.
Examination Report dated Feb. 17, 2020 pertaining to GCC Application No. 2018-35842, filed Aug. 14, 2018, 4 pgs.
Examination Report dated Feb. 5, 2020 pertaining to GCC Application No. 2018-35843, filed Aug. 14, 2018, 3 pgs.
Office Action dated Mar. 16, 2020 pertaining to U.S. Appl. No. 16/100,836, filed Aug. 10, 2018, 11 pgs.
Office Action dated Mar. 19, 2020 pertaining to U.S. Appl. No. 16/055,890, filed Aug. 6, 2018, 38 pgs.
International Search Report and Written Opinion dated Nov. 27, 2018 pertaining to International application No. PCT/US2018/04621 filed Aug. 10, 2018, 8 pgs.
Nhlapo, Susan N., "Intercalation of fatty acids into layered double hydroxides" University of Pretoric, Oct. 1, 2008.
Office Action dated Dec. 31, 2019 pertaining to U.S. Appl. No. 16/057,367, filed Aug. 7, 2018, 39 pgs.
Liang, et al. "Direct Synthesis of Unilamellar MgAl-LDH Nanosheets and Stacking in Aqueous Solution" Langmuir 2015, 31, 45, 12464-12471: (Year: 2015).
Constantino, et al. "Basis Properties of Mg2+1-x layered Double Hydroxides Intercalated by Carbonate, Hydroxide, Chloride and Sulfate Anions" (Year: 1994).
Notice of Allowance and Fee(s) Due dated Jan. 31, 2020 pertaining to U.S. Appl. No. 16/055,881, filed Aug. 6, 2018, 12 pgs.
Notice of Allowance and Fee(s) Due dated Jan. 17, 2020 pertaining to U.S. Appl. No. 16/059,550, filed Aug. 9, 2018, 11 pgs.

(56) References Cited

OTHER PUBLICATIONS

Notice of Allowance and Fee(s) Due dated Jan. 17, 2020 pertaining to U.S. Appl. No. 16/059,558, filed Aug. 9, 2018, 11 pgs.
Notice of Allowance and Fee(s) Due dated Jan. 17, 2020 pertaining to U.S. Appl. No. 16/059,867, filed Aug. 6, 2018, 9 pgs.
Office Action dated Feb. 21, 2020 pertaining to U.S. Appl. No. 16/200,829, filed Aug. 10, 2018, 8 pgs.

* cited by examiner

LAYERED DOUBLE HYDROXIDES FOR OIL-BASED DRILLING FLUIDS

CROSS REFERENCE TO RELATED APPLICATIONS

This application claims the benefit of U.S. Provisional Application Ser. No. 62/545,673 filed Aug. 15, 2017.

TECHNICAL FIELD

Embodiments of the present disclosure generally relate to oil-based drilling fluids for use in high pressure and high temperature drilling operations. More specifically, embodiments of the present disclosure relate to oil-based drilling fluids comprising a rheology modifier.

BACKGROUND

Drilling operations to drill a new wellbore for hydrocarbon extraction, for example, include the common practice of continuously circulating a drilling fluid (alternatively known as a drilling mud) through the wellbore during the drilling operation. The drilling fluid is pumped downhole where the drilling fluid then flows uphole through the annular space between the wellbore wall and the drill pipe, and finally flows uphole from the wellbore where it is recovered for secondary processing. Specifically, the drilling fluid is mechanically or chemically treated to remove captured solids and drill cuttings from the drilling fluid and before recirculating the drilling fluid back through the wellbore.

Given the circulating nature of drilling fluid and its functionality in capturing solids and cuttings during drilling operations, drilling fluids must be free-flowing with a relatively low viscosity in order to facilitate pumping while having sufficient substance to retain and transport the cuttings and other solids and to suspend the weight material so as to maintain a mud column of uniform density in the wellbore during static and circulating conditions. The drilling fluid must also have a gel strength sufficient to suspend the solids and cuttings to prevent accumulation of solids at the bottom of the wellbore if circulation of the drilling fluid is stopped. Solids accumulating at the bottom of the wellbore can jam the drill and block the drilling fluid's flow path.

Drilling in deep wells is complicated by geological conditions that involve high pressures and high temperatures (HPHT). The industry-defined definition of HPHT conditions typically include a wellbore temperature greater than 300° F. (149° C.) and a wellbore pressure greater than 10,000 psi (68.9 MPa).

SUMMARY

There are ongoing needs for drilling fluids and for rheology modifiers that render the drilling fluids thermally stable under HPHT conditions and rheologically suitable for use in well treatments. When added to oil based drilling fluids, rheology modifiers can enhance rheological properties such as "fragile gel" properties and shear thinning behavior.

Accordingly, some embodiments of this disclosure include oil-based drilling fluids that include a base oil continuous phase comprising a base oil, an aqueous dispersed phase and at least one rheology modifier. The at least one rheology modifier includes a magnesium/aluminum (Mg/Al) layered-double hydroxide (LDH) diamondoid compound.

Some embodiments include methods of making the oil-base drilling fluids. The method includes mixing a base oil, optionally an emulsifier, and optionally a wetting agent to form a first mixture. An aqueous dispersed phase and at least one rheology modifier are mixed into the first mixture to form an oil-based drilling fluid, the at least one rheology modifier includes a layered-double hydroxide magnesium/aluminum-diamondoid compound.

DETAILED DESCRIPTION

Figure 1:
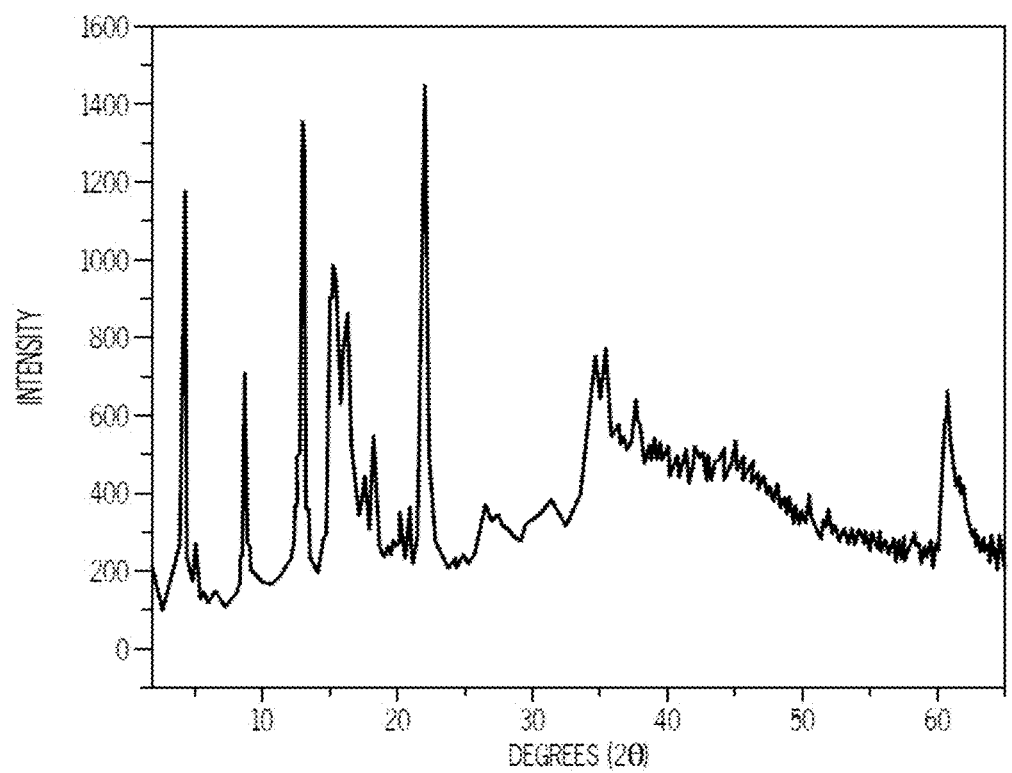
FIG. 1 is a Powder X-Ray Diffraction (PXRD) pattern of a Mg/Al-adamantoate LDH according to one embodiment.

Specific embodiments of oil-based drilling fluids including rheological modifiers will now be described. It should be understood that the rheological modifiers and the oil-based drilling fluids of this disclosure may be embodied in different forms and should not be construed as limited to the specific embodiments set forth in this disclosure. Rather, embodiments are provided so that this disclosure will be thorough and complete and will fully convey the scope of the subject matter to those skilled in the art.

When a subterranean well is drilled, a drill string including a drill bit and drill collars is inserted into a predrilled hole and rotated to cause the drill bit to cut into the rock at the bottom end of the hole. The drilling operation produces rock fragments known as cuttings. To remove the rock fragments from the bottom end of the wellbore, a drilling fluid such as the oil-based drilling fluid composition according to embodiments of this disclosure is pumped downhole through the drill string to the drill bit. The drilling fluid cools the drill bit, provides lubrication, and lifts the rock fragments away from the drill bit. The drilling fluid carries the cuttings uphole as the drilling fluid is recirculated back to the surface. At the surface, the cuttings are removed from the drilling fluid through a secondary operation, and the drilling fluid is recirculated back downhole to the bottom end of the wellbore to collect further cuttings.

The oil-based fluids according to embodiments may include drilling muds, packer fluids, and completion fluids. The oil-based drilling fluids serve a number of functions during a drilling operation. For example, the oil-based drilling fluids may suspend the cuttings and weighted material and transport the cuttings to the wellbore surface with the oil-based drilling fluid. Additionally, the oil-based drilling fluid may absorb gases such as carbon dioxide ($CO_2$), hydrogen sulfide ($H_2S$), and methane ($CH_4$) in a wellbore and transport them to the wellbore surface for release, sequestration, or burn-off. The oil-based drilling fluids additionally may provide buoyancy to the drill string, relieving the tension on the drill string as the length of the wellbore increases. The oil-based drilling fluid may also cool or lubricate the bit and drill string utilized in drilling operations. The oil-based drilling fluids may control subsurface pressures. Specifically, the oil-based drilling fluid may provide hydrostatic pressure in the wellbore to provide support to the sidewalls of the wellbore and prevent the sidewalls from collapsing or caving in on the drill string. Additionally, the oil-based drilling fluid may provide hydrostatic pressure in the wellbore to prevent fluids in the downhole formations from flowing into the wellbore during drilling operations.

Under extreme downhole conditions, such as excessive temperature or difficult formations, some of the properties of a conventional drilling fluid may be altered. For example, interaction of a conventional drilling fluid with a formation having swelling clay or excessive solids content may cause the drilling fluid to thicken or thin, excessively increase or decrease in viscosity, or any combination of these. Likewise, subjecting the conventional drilling fluid to extreme downhole temperatures may cause the conventional drilling fluid to thicken or thin, excessively increase or decrease in viscosity, or any combination of these. A drilling fluid utilized in industry-defined high pressure and high temperature (HPHT) operations may experience a wellbore temperature greater than 300° F. (149° C.) and a wellbore pressure greater than 10,000 psi (68.9 MPa). Under HPHT conditions, drilling fluids may decompose or experience undesirable changes in rheology.

Embodiments of the oil-based drilling fluid are formulated to provide a fluid having a rheology suitable for HPHT drilling operations. Specifically, the oil-based drilling fluids are formulated to have a greater viscosity at lower shear rates than commercially available HPHT oil-based drilling fluids have, as well as a lower viscosity at high shear rates than commercially available HPHT oil-based drilling fluids have. Low shear rates are usually below 10 $s^{-1}$ and high shear rates are generally greater than 100 $s^{-1}$. The greater viscosity at low shear rates increases the ability of the oil-based drilling fluid to hold cuttings when drilling operations are halted. Conversely, the lower viscosity of the oil-based drilling fluids at high shear rates decrease the energy required to circulate the oil-based drilling fluid during drilling operations.

In one or more embodiments, an oil-based drilling fluid includes a base oil phase, an aqueous dispersed phase, and at least one rheology modifier. The at least one rheology modifier includes a layered-double hydroxide (LDH) diamondoid compound. In some embodiments, the LDH diamondoid compound includes a magnesium/aluminum (Mg/Al) layered-double hydroxide diamondoid compound. In other embodiments, the LDH diamondoid compound includes a magnesium/aluminum (Mg/Al) layered-double hydroxide diamondoid compound.

As used in this specification, the term "diamondoid compound" encompasses variants of carbon cage molecules known as adamantane ($C_{10}H_{16}$). The carbon cages include tricyclic, tetracyclic, pentacyclic, and polycyclic structures. In some embodiments, diamondoid compound includes adamantane, diamantane, triamantane and higher polymantanes. Example diamondoid compounds may include a functional group such as a carboxylic acid, a hydroxyl, a carboxylic ester, or an amine. A specific example of a diamondoid compound having a functional group is 1-adamantane carboxylic acid.

The preparation of Mg/Al LDH diamondoid compound (called adamantane-intercalated LDH particles) is described in commonly-assigned U.S. Provisional Application Ser. No. 62/309,645, filed Mar. 17, 2016, which is incorporated by reference in its entirety into this disclosure. The Mg/Al LDH diamondoid compound is called adamantane-intercalated LDH particles in the commonly assigned application. In general, the Mg/Al LDH diamondoid compound may be prepared by forming a slurry or an aqueous solution of a magnesium compound, an aluminum compound, and a diamondoid compound having at least one carboxylic acid moiety. The slurry or aqueous solution is then heated at a reaction temperature for a reaction time to form the magnesium/aluminum (Mg/Al) adamantane diamondoid compound. The aluminum salt may include aluminum hydroxide ($Al(OH)_3$) or aluminum oxide ($Al_2O_3$). The magnesium salt may include, for example, magnesium hydroxide ($Mg(OH)_2$) or magnesium oxide (MgO). In one example, the magnesium salt is $Mg(OH)_2$ and the aluminum salt is $Al(OH)_3$.

The initial slurry or aqueous solution for preparing the Mg/Al LDH diamondoid compound may have an Mg/Al molar ratio of from 1:1 to 5:1, or from 1:1 to 3:1.

To the initial slurry or aqueous solution, an amount of adamantane is added to form a reaction mixture having an Al/adamantane molar ratio of from 0.5:1 to 2:1. In one or more additional embodiments, the Al/adamantane molar ratio may be from 0.8:1 to 1.2:1, or may be 1:1. The adamantane added to the initial slurry or aqueous solution may be adamantane ($C_{10}H_{16}$) or a functionalized adamantane such as an adamantane carboxylic acid, an adamantane hydroxide, an adamantane carboxylic ester, or an adamantane amine. In one embodiment, the adamantane added to the initial slurry or aqueous solution may be an adamantane carboxylic acid such as 1-adamantane carboxylic acid. Optionally, the reaction mixture may be stirred.

The reaction temperature for preparing the magnesium/aluminum LDH diamondoid compound may be from 100° C. to 180° C. or from 140° C. to 160° C. The reaction time may be at least 12 hours.

Generally, LDHs for conversion to mixed metal oxide catalysts are prepared with inorganic guest anions, which may be easily removed under thermal treatment. When using an organic anion, such as carboxylic acid functionalized adamantane, improved properties for LDHs may be achieved. Adamantane has a structure characterized by high symmetry (Td), is free from intra-molecular strain and, as a result, is extremely thermodynamically stable. At the same time, adamantane can be chemically functionalized. Adamantane has a melting point of 270° C. and it slowly sublimes even at room temperature. Adamantane is poorly soluble in water, but readily soluble in hydrocarbons.

After the reaction mixture is heated to produce the Mg/Al LDH diamondoid compound, where the Mg/Al LDH diamondoid compound has aspect ratios greater than 100. As defined, the Mg/Al LDH diamondoid compound means the adamantane is inserted into the LDH particle matrix. In further embodiments, the aspect ratio of the Mg/Al LDH diamondoid compound is greater than 125, or greater than 150, or greater than 200. Moreover, the Mg/Al LDH diamondoid compound has a particle diameter of 2 to 12 μm, or from 5 to 10 μm. The heating step may occur at a reaction temperature from 110° C. to 180° C. for a reaction time of 12 hours to 48 hours, or from 130° C. to 170° C. for a reaction time of 20 hours to 30 hours.

In some embodiments, the oil-based drilling fluid may include from 0.05 wt. % to 5.0 wt. %, from 0.1 wt. % to 1.0 wt. %, or from 0.1 wt. % to 0.5 wt. % including magnesium/aluminum layered-double hydroxide diamondoid compound as a rheology modifier, based on the total weight of the oil-based drilling fluid.

The base oil continuous phase of the oil-based drilling fluid may be any fluid such as an oil or a solution containing an oil and one or more organic or inorganic compounds dissolved in the oil or otherwise completely miscible with the oil. The base oil continuous phase may include at least one base oil chosen from natural petroleum product or synthetic oil. The synthetic oil or natural petroleum product may be composed of hydrocarbons such as n-paraffins, iso-paraffins, cyclic alkanes, branched alkanes, or mixtures thereof. The base oil continuous phase of the drilling fluid may include oils derived from petroleum, such as mineral oils, diesel oils, linear or branched olefins, polyolefins, esters of fatty acids, straight chain, branched or cyclical alky ethers of fatty acids, other petroleum-derived oils, or combinations of any of these. The base oil continuous phase may contain esters, ethers, acetals, dialkylcarbonates, hydrocarbons, or combinations of any of these. The base oil continuous phase may also include oils derived from animals or plants, such as safra oil, for example. In some embodiments, the based oil continuous phase may also include in conventional drilling fluids for drilling applications.

In some embodiments, the oil-based drilling fluid may contain at least 10.0 wt. % base oil continuous phase, and may include from 10.0 wt. % to 20.0 wt. % base oil, based on the total weight of the oil-based drilling fluid. In other embodiments, the oil-based drilling fluid may contain from approximately from 13.0 wt. % to 17.0 wt. % or from 14.0 wt. % to 16 wt. % base oil continuous phase, based on the total weight of the oil-based drilling fluid.

The aqueous dispersed phase of the oil-based drilling fluid may be any fluid that is not completely miscible and can form an emulsion in the base oil continuous phase. For example, the aqueous dispersed phase may be water or a solution containing water and one or more organic or inorganic compounds dissolved in the water or otherwise completely miscible with the water. In some embodiments, the aqueous dispersed phase may contain water, including freshwater, well water, filtered water, distilled water, sea water, salt water, produced water, formation brine, other type of water, or combinations of waters. In embodiments, the aqueous dispersed phase may contain brine, including natural and synthetic brine. Brine includes water and one or more salts chosen from calcium chloride, calcium bromide, sodium chloride, sodium bromide, and combinations thereof. In some embodiments, the aqueous dispersed phase may include water-soluble organic compounds as additives or impurities dissolved in the water. The water-soluble organic compounds may include alcohols, organic acids, amines, aldehydes, ketones, esters, or other polar, water-soluble organic compounds.

In one or more embodiments, the oil-based drilling fluid may contain from 1.0 wt. % to 10.0 wt. % aqueous dispersed phase, based on the total weight of the oil-based drilling fluid. In other embodiments, the oil-based drilling fluid may include from 2.0 wt. % to 7.0 wt. % or from 2.0 wt. % to 5 wt. % aqueous discontinuous phase, based on the total weight of the oil-based drilling fluid.

The oil-based drilling fluid optionally may include one or more additives. Example additives include one or more wetting agents, one or more emulsifiers, one or more additional rheology modifiers, one or more fluid-loss control additives, or one or more weighting additive. The oil-based drilling fluid optionally may include pH adjusters, electrolytes, glycols, glycerols, dispersion aids, corrosion inhibitors, defoamers, or other additives or combinations of additives known or used in conventional drilling fluids.

In one or more embodiments, the oil-based drilling fluid may contain a surfactant such as a wetting agent to enhance the stability of suspensions or emulsions in the oil-based drilling fluid. Suitable wetting agents may include fatty acids, organic phosphate esters, modified imidazolines, amidoamines, alkyl aromatic sulfates, and sulfonates. For example, SUREWET®, commercially available from M-I SWACO, Houston, Tex., is an oil based wetting agent and secondary emulsifier that may be used to wet fines and drill solids to prevent water-wetting of solids. Moreover, SUREWET® may improve thermal stability, rheological stability, filtration control, emulsion stability of wellbore fluids, VERSAWET®, commercially available from M-I LLC, Houston. Tex., is a wetting agent that is especially effective in difficult to wet hematite systems. An example oil-based drilling fluid optionally may include from 0.1 wt. % to 2 wt. % of a wetting agent based on the total weight of the oil-based drilling fluid. In some embodiments, the oil-based drilling fluid optionally may include from 0.25 wt. % to 0.75 wt. % SUREWET® based on the total weight of the oil-based drilling fluid. The oil-based drilling fluid may optionally include other wetting agents known or used in conventional drilling fluids.

The oil-based drilling fluids optionally may include one or more emulsifiers that facilitate formation of an emulsion and reduce interfacial tension between the base oil phase of the oil-based drilling fluid and the aqueous dispersed phase of the oil-based drilling fluid. In some embodiments one or more emulsifiers may be added to the oil-based drilling fluid. Examples of emulsifiers include surfactants, detergents, lignosulfonates, lignitic compounds, and materials derived from tall oil fatty acids (TOFA). Additional example emulsifiers include an invert emulsifier and oil-wetting agent for synthetic based drilling fluid systems such as LE SUPERMUL™ commercially available from Halliburton Energy Services, Inc. and MUL XT commercially available from M-I SWACO.

In one or more embodiments, the oil-based drilling fluid optionally may contain one or a plurality of emulsifiers, and the total amount of emulsifier one or more emulsifiers in the oil-based drilling fluid may be from 0.00 wt. % to 5 wt. %, from 0.1 wt. % to 2.5 wt. %, from 0.1 wt. % to 1.5 wt. %, from 0.1 wt. % to 1 wt. %, from 0.5 wt. % to 2.5 wt. %, from 0.5 wt. % to 2 wt. %, from 0.5 wt. % to 1.5 wt. %, from 0.5 wt. % to 1 wt. %, from 0.75 wt. % to 2.5 wt. %, or from 0.75 wt. % to 2 wt. %, based on the total weight of the drilling fluid.

The oil-based drilling fluid optionally may include a fluid-loss control agent that reduces the amount of filtrate lost from the drilling fluid into a subsurface formation. Examples of fluid-loss control agents include organophilic (for example, amine-treated) lignite, bentonite, manufactured polymers, and thinners or deflocculants. Additional examples of fluid-loss control agents include: VERSATROL™, VERSALIG™, ECOTROL™ RD, ONETROL™ HT, EMI 789 and NOVATECH™ F, all commercially available from MI SWACO, Houston, Tex., U.S.A., and ADAPTA® which is commercially available from Halliburton Energy Services, Inc. In some embodiments, the oil-based drilling fluid may optionally include both ONETROL™ HT and ECOTROL™ RD. In some embodiments, when fluid-loss control agents are included in the oil-based drilling fluid, the total amount of fluid-loss control agents may be from approximately 0.5 wt. % to approximately 3.0 wt. % of the oil-based drilling fluid, based on the total weight of the drilling fluid. In other embodiments, the oil-based drilling fluid may include from 0.9 wt. % to 2.0 wt. % or from 1.0 wt. % to 1.5 wt. %.

The oil-based drilling fluid optionally may include a suspending agent that adjusts the viscosity of the oil-based drilling fluid to result in a yield point at a low shear rate sufficient to suspend all of the drilling fluid components, and thereby avoid the settling of components of the drilling fluid. Examples of suspending agents include fatty acids and fibrous materials. In some embodiments when suspending agents include fatty acids and fibrous materials. In embodiments, for which the oil-based drilling fluid includes a suspending agent, the oil-based drilling fluid may contain from 0.0 wt. % to 1.0 wt. % or 0.01 to 0.5 wt. %, based on the total weight of the drilling fluid.

In some embodiments, the oil-based drilling fluid may optionally include a weighting material. The weighting material may be a particulate solid having a specific gravity sufficient to increase the density of the drilling fluid by a desired amount. Weighting materials may be used to control formation pressures and to help combat the effects of sloughing or heaving shales that may be encountered in stressed areas. Any substance that is more dense than water and that does not adversely affect other properties of the drilling fluid can be used as a weighting material. The weighting material may have a specific gravity of from 2 to 6. Examples of weighting materials include, but are not limited to, barite ($BaSO_4$); hematite ($Fe_2O_3$); calcium carbonate ($CaCO_3$); siderite; manufactured iron oxide, such as ilmenite ($FeO \cdot TiO_2$), siderite ($FeCO_3$); celesite ($SrSO_4$); dolomite ($CaCO_3 \cdot MgCO_3$); galena (PbS), magnetite ($Fe_3O_4$); and other weighting materials, or any combination of these weighting materials. Some embodiments of the oil-based drilling fluid may include barite as the weighting material.

The optional weighting materials or density adjusting agents of the oil-based drilling fluid may increase the weight of the oil-based drilling fluid, the density of the oil-based drilling fluid, or both. In some embodiments, the oil-based drilling fluid may include from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting material based on the total weight of the oil-based drilling fluid. In general, the amount of optional weighting material in the oil-based drilling fluid is sufficiently great to attain a desirable density of the oil-based drilling fluid and is sufficiently small to avoid an oil-based frilling fluid that cannot be circulated through a wellbore.

The oil-based drilling fluid optionally may include a pH adjuster. In embodiments, the oil-based drilling fluid optionally may include an alkaline compound that increases the pH of the oil-based drilling fluid. Examples of alkaline compounds include, but are not limited to, lime (calcium hydroxide or calcium oxide), soda ash (sodium carbonate), sodium hydroxide, potassium hydroxide, other strong bases, or combinations of these alkaline compounds. During drilling operations with the oil-based drilling fluid, the alkaline compounds may react with gases such as $CO_2$ or $H_2S$, for example, and prevent the gases from hydrolyzing components of oil-based drilling fluid. Some example oil-based drilling fluids optionally may include from 0.1 wt. % to 3.0 wt. %, 0.5 wt. % to 2.5 wt. %, or 1.0 wt. % to 2.0 wt. % lime. In embodiments, the oil-based drilling fluid may have an alkalinity of 0 to 15 grams per liter (g/L) excess lime.

In some embodiments, the oil-based drilling fluid optionally may include one or more rheology modifiers, such as viscosifiers or clays, in addition to the Mg/Al-diamondoid LDH. Examples of viscosifiers may include, but are not limited to, bentonite, organophilic clay, polyacrylamide, polyanionic cellulose, or combinations of these viscosifiers. In some embodiments, the oil-based drilling fluid may optionally include a hectorite clay, for example, VERSAGEL HT commercially available from MI-SWACO, Houston, Tex. In some embodiments, the oil-based drilling fluid may optionally include an organophilic clay, for example Bentone® 42 commercially available from Elements Specialties Inc., Hightstown, N.J. An example oil-based drilling fluid optionally may include from 0.0 wt. % to 2 wt. % of rheology modifier in addition to the Mg/Al-diamondoid LDH, based on the total weight of the oil-based drilling fluid. In some embodiments, the oil-based drilling fluid optionally may include from 0.25 wt. % to 0.5 wt. % of each of VERSAGEL HT and Bentone 42 based on the total weight of the oil-based drilling fluid. The oil-based drilling fluid may optionally include other viscosifiers known or used in conventional drilling fluids.

Having previously described the oil-based drilling fluids according to various embodiments, illustrative methods for preparing the oil-based drilling fluids will now be described. In some embodiments, the method for preparing an oil-based drilling fluid includes mixing a base oil, optionally an emulsifier, and optionally a wetting agent to form a first mixture; and mixing an aqueous dispersed phase and at least one rheology modifier into the first mixture to form an oil-based drilling fluid, the at least one rheology modifier comprising a layered-double hydroxide magnesium/aluminum-diamondoid compound. The methods for preparing the oil-based drilling fluids further includes adding at least one fluid-loss control additive, adding a brine solution, adding a weighting additive, or adding in any combination of at least one fluid-loss control additive, a brine solution, and a weighting additive.

In one or more embodiments, methods for preparing an oil-based drilling fluid include adding ingredients in a mixing order. To prepare the oil-based drilling fluid, a base oil, optionally at least one emulsifier, and optionally at least one wetting agent are mixed to form a first mixture. At least one rheology modifier is added to the first mixture to form a second mixture. The at least one rheology modifier is added to the first mixture includes a Mg/Al-diamondoid LDH compound, as previously described.

Optionally, the methods for preparing the oil-based drilling fluids may include adding at least one fluid-loss control additive into the second mixture to form a third mixture. The at least one fluid-loss control additive may be added to the second mixture in an amount that provides a final oil-based drilling fluid containing approximately 0.5 wt. % to approximately 3.0 wt. % of the oil-based drilling fluid or from 0.9 wt. % to 2.0 wt. % or from 1.0 wt. % to 1.5 wt. % fluid-loss control additive, based on the total weight of the oil-based drilling fluid.

Optionally, the methods for preparing the oil-based drilling fluids may include adding a brine solution to the third mixture to form a fourth mixture. The brine solution may be added to the third mixture in an amount that provides a final oil-based drilling fluid containing from approximately 1.0 wt. % to approximately 10.0 wt. % brine, based on the total weight of the oil-based drilling fluid.

Optionally the methods for preparing the oil-based drilling fluids may include adding a weighting material to the fourth mixture to form the oil-based drilling fluid. The weighting material may be added to the fourth mixture in an amount that provides to a final oil-based drilling fluid containing from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting material based on the total weight of the oil-based drilling fluid.

In the methods of making the oil-based drilling fluid, when an ingredient is added to an existing mixture form a new mixture, including to the first mixture to form the second mixture, to the second mixture to form the third mixture, to the third mixture to form the fourth mixture, or to the fourth mixture to form the oil-based drilling fluid, the new mixture optionally is mixed by an appropriate agitation method, such as by mechanical stirring.

The oil-based drilling fluids previously described, including oil-based drilling fluids prepared according to embodiments of methods for preparing oil-based drilling fluids in this disclosure, as well as oil-based drilling fluids according to embodiments of this disclosure but prepared by other industry-acceptable techniques understood by the person of ordinary skill, may be well-suited for use in drilling operations in subterranean formations, particularly for drilling operations performed under HPHT conditions of a wellbore pressure greater than 10,000 psi and a wellbore temperature greater than 300° F. (149° C.). Accordingly, embodiments of methods for drilling in a subterranean formation under high-pressure high-temperature conditions may include using the oil-based drilling fluid for the drilling of a wellbore in a subterranean formation.

In the methods for drilling in a subterranean formation, the oil-based drilling fluid includes a Mg/Al-diamondoid LDH compound as a rheology modifier. Under high-pressure high-temperature conditions, which includes temperature from 250° F. (120° C.) to 400° F. (205° C.) and pressures from 10,000 pound-force per square inch (psi) to 20,000 psi, the oil-based drilling fluid may have a reduced viscosity than the viscosity of a comparative drilling fluid would have at the same conditions. As used here, a "comparative drilling fluid" is a drilling fluid having all the same ingredients as the oil-based drilling fluid in weight proportions to each other identical to the weight proportions of the same ingredients to each other in the oil-based drilling fluid, with the exceptions that (1) the comparative drilling fluid lacks the Mg/Al—CO$_3$ LDH compound; and (2) one or both of the amount of base oil or the amount of weighting agent in the comparative drilling fluid is adjusted so that the comparative drilling fluid has a specific gravity that matches the specific gravity of the oil-based drilling fluid and an oil-to-water ratio that matches the oil-to-water ratio of the oil-based drilling fluid.

EXAMPLES

The following examples illustrate one or more additional features of the present disclosure described previously. It should be understood that these examples are not intended to limit the scope of the disclosure or the appended claims in any manner.

Example 1

Preparation of Diamondoid-Intercalated Magnesium/Aluminum Layered Double Hydroxides As an illustrative example of a diamondoid-intercalated Mg/Al layered double hydroxide diamondoid (Mg/Al LDH diamondoid) compound according to embodiments described in this disclosure, a Mg/Al adamantoate layered double hydroxide (Mg/Al-adamantoate LDH) was prepared. Initially, a 5 wt. % solution of Mg(OH)$_2$ was prepared by dissolving 5 grams (g) of Mg(OH)$_2$ in 95 g of de-ionized water. To the resultant solution, 3.36 g of Al(OH)$_3$ was added in an amount sufficient to provide a Mg/Al molar ratio of 2. Then, 9.31 g of adamantane carboxylic acid was added to the solution in an amount sufficient to provide an Al/adamantane molar ratio of 1:1 in the resultant reaction mixture. The pH of the reaction mixture was measured and was found to be 9.5.

The reaction mixture then was stirred vigorously for 1 hour at room temperature. The stirred reaction mixture was transferred to a Teflon-lined autoclave and was heated at 150° C. for 24 hours (h). A layered double hydroxide material was filtered from the mixture. The pH of the filtrate was measure and was found to be 8.6. In another set of experiments, the above procedure was repeated by using an Mg/Al molar ratio of 5. After the reaction was over, the products were washed thoroughly with water and dried at 65° C.

Figure 2:
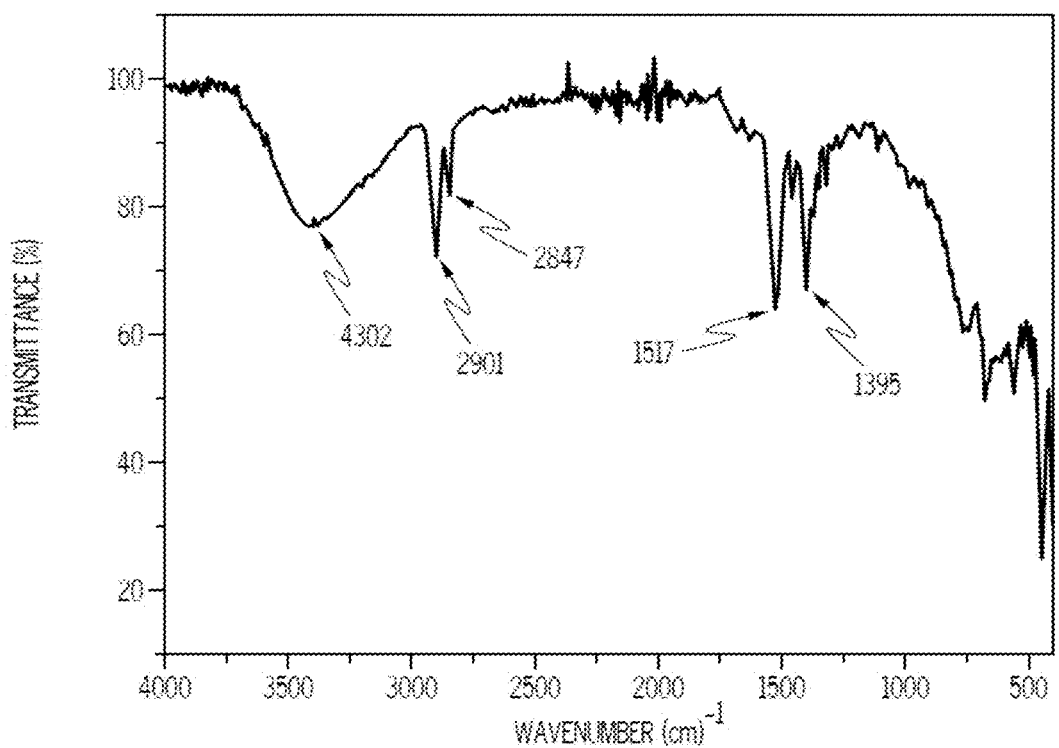
FIG. 2 is an Infrared (IR) transmittance spectrum of a Mg/Al-adamantoate LDH according to one embodiment.

The PXRD pattern of the as synthesized LDH is given in FIG. 1, and shows the basal reflection (001) at 20.84 Å corresponds to a bilayer arrangement of adamantane ions in the interlayer. The submultiples of (001) are seen at higher 2θ values. Referring to FIG. 2, intercalation of adamantoic acid was further characterized with IR spectra. The vibrations at 1517 cm$^{-1}$ and 1395 cm$^{-1}$ correspond to antisymmetric and symmetric stretching vibrations of the COO$^-$ group. The vibrations at 2901 cm$^{-1}$ and 2847 cm$^{-1}$ are for the C—H vibrations. The 4302 cm$^{-1}$ vibration is due to hydrogen bonding of layer metal hydroxide groups with intercalated water molecules in the interlayer.

Figure 3:
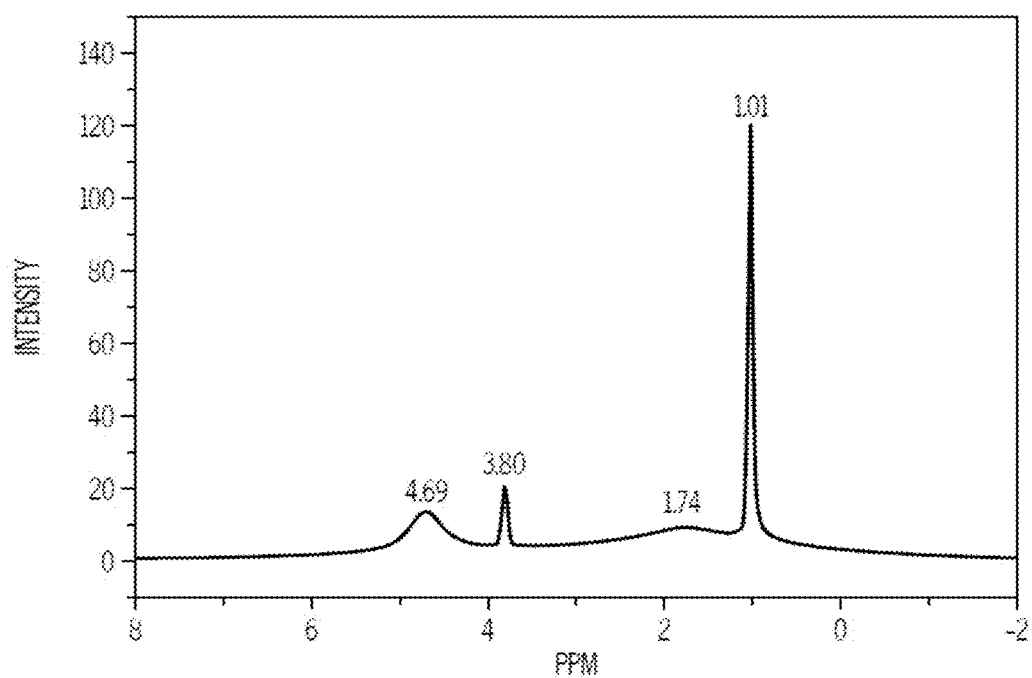
FIG. 3 is a proton solid-state Nuclear Magnetic Resonance (NMR) spectrum of a Mg/Al-adamantoate LDH according to one embodiment.
Figure 4:
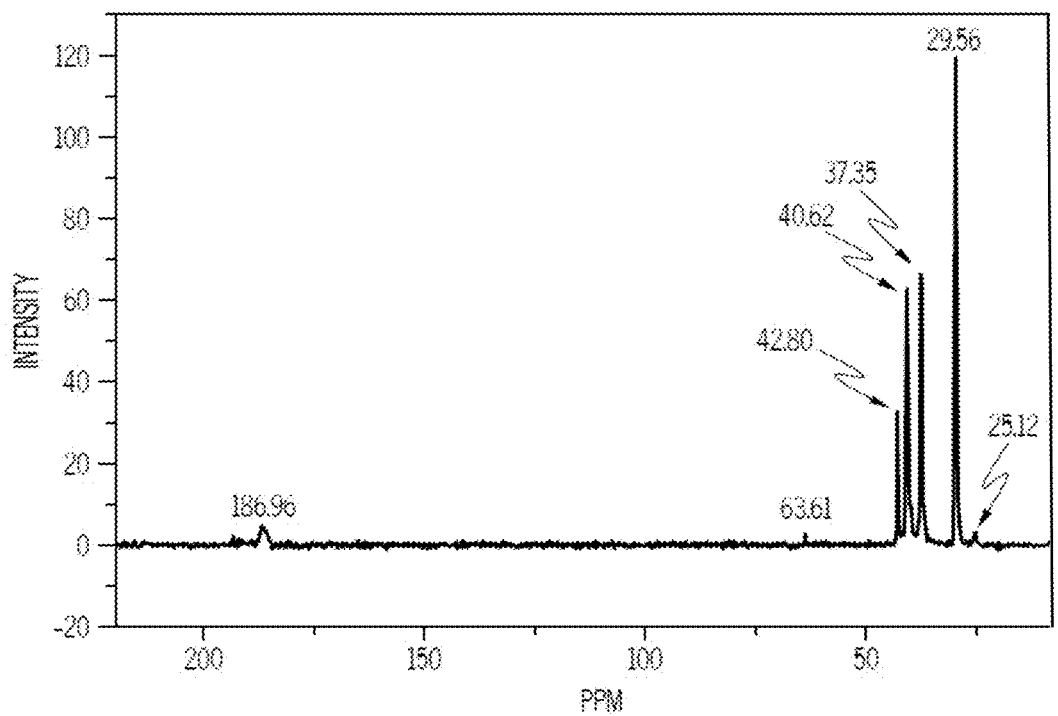
FIG. 4 is a carbon-13 ($^{13}C$) solid-state NMR spectrum of a Mg/Al-adamantoate LDH according to one embodiment.

The $^1$H and $^{13}$C solid-state NMR spectra of Mg/Al-adamantoate LDH were recorded and are given in FIGS. 3 and 4, respectively. The 4 sharp peaks in the $^1$H spectra of FIG. 3 at lower ppm values are due to the hydrogens present in the adamantane ring. The peak at 3.8 ppm and 4.8 ppm are due to hydrogens of the intercalated water and metal hydroxide respectively. Referring to FIG. 4, the $^{13}$C NMR spectra of Mg/Al-adamantoate shows 4 peaks at 29.5 ppm, 37.3 ppm, 40.6 ppm and 42.8 ppm are due to 4 different carbons present in the adamantane molecule. The peak at 186.98 ppm is due to the carbon of the carboxylate group.

Example 2

Rheology Studies of Drilling Fluids

To compare the physical and rheological properties of a drilling fluid containing a Mg/Al LDH diamondoid compound of Example 1 with those of a drilling fluid containing an industry standard rheology modifier, two drilling fluids were prepared. The two drilling fluids were based on the M-I SWACO RHADIANT™ system that includes a blend of three proprietary emulsifiers, fluid-loss control agents, and rheology modifier specially tailored for oil-based fluid formulations. The drilling fluid of Example 1 was prepared using SUREWET® as the wetting agent, SUREMUL® as an emulsifier, and Mg/Al LDH diamondoid compound as a rheology modifier. The Comparative Fluid was prepared by replacing Mg/Al LDH diamondoid compound with Bentone 42 and increasing the amount of based oil.

The two drilling fluids were formulated using the following ingredients: Saraline 185V, a synthetic oil drilling base fluid, available from Shell; SUREMUL®, an amidoamine emulsifier, available from M-I SWACO, LLC (Houston, Tex., USA); SUREWET®, a wetting agent, available from M-I SWACO, LLC (Houston, Tex., USA); MUL XT, an emulsifier for use in non-aqueous fluid systems, available from M-I SWACO, LLC (Houston, Tex., USA); VERSA-GEL HT, a hectorite clay viscosifier for aiding in filtercake formation and filtration control, available from M-I SWACO, LLC (Houston, Tex., USA); ONE-TROL™ HT, an amine-treated tannin filtration control additive designed for use in oil and synthetic-base drilling fluid systems, available from M-I SWACO, LLC (Houston, Tex., USA); ECOTROL RD, a filtration control additive designed for use in oil and synthetic-base drilling fluid systems, available from M-I SWACO, LLC (Houston, Tex., USA); and barite (BaSO$_4$) weighting agent, available from M-I SWACO, LLC (Houston, Tex., USA).

Referring to Table 1, the two drilling fluids were prepared in 771.9 g quantities. The formulations and other ingredients amounts are provided in Table 1 for the two drilling fluids. To prepare the drilling fluids, the base oil, emulsifiers, and wetting agents were mixed together first for 10 minutes during stage 1, and then the viscosity modifiers and rheology modifiers were added and mixed for another 20 minutes during stage 2. Next, in stage 3 the fluid-loss control additives were added and mixed for 20 minutes, followed by brine and fresh water in stage 4 and barite in stage 5, which were mixed for 30 minutes and 40 minutes, respectively. The quantity of base oil used was slightly different for the Mg/Al LDH diamondoid compound to provide a specific gravity of 2.20 and an oil/water ratio of 90.0, identical to the respective properties of comparative drilling fluid.

TABLE 1

Formulation and Mixing Procedure for HPHT Oil Based Drilling Fluids

| Ingredient | Function | Fluid with Mg/Al LDH diamondoid (Example 1) (g) | Comparative Fluid (g) | Mixing Order and Time |
|---|---|---|---|---|
| Saraline 185V | Base Oil | 122.0 | 122.0 | Stage 1 (5 min) |
| SUREMUL | Emulsifier | 10.0 | 10.0 | |
| SUREWET | Wetting Agent | 4.0 | 4.0 | |
| MUL XT | Emulsifier | 4.0 | 4.0 | |
| VERSAGEL HT | Viscosifier | 2.75 | 2.75 | Stage 2 (10 min) |
| Bentone 42 | Rheology Modifier | 0.0 | 2.75 | |
| Mg/Al Adamantane Layered Double Hydroxide | Rheology Modifier | 2.75 | 0.0 | |
| Lime | Alkalinity Control | 6.0 | 6.0 | |
| ONE-TROL HT | Fluid Loss Control | 8.0 | 8.0 | Stage 3 (10 min) |
| ECOTROL RD | Fluid Loss Control | 0.8 | 0.8 | |
| CaCl$_2$ brine | Internal Phase | 28.5 | 28.5 | Stage 4 (15 min) |
| Fresh water | Internal Phase | 5.9 | 5.9 | |
| Barite | Weight Material | 577.2 | 577.3 | Stage 5 (20 min) |
| Total | | 771.9 | 771.9 | 60 min |
| Specific Gravity | | 2.20 | 2.20 | |
| Oil/Water Ratio (volumetric) | | ~90.0 | ~90.0 | |

Rheological properties measured with a rotational viscometer are commonly used to calculate hydraulics of a drilling fluid. A rotational viscometer is used to measure shear rate/shear stress of a drilling fluid, from which the plastic viscosity and yield point are calculated directly. The drilling fluids of Example 1 and the Comparative Fluid were tested to determine their rheological properties before and after hot rolling, which is known as high-temperature aging. The rheological properties studied were viscosity, gel strength, fluid loss, plastic viscosity, and yield point of the drilling fluids. These properties were studied using the Fann Model 35 VG Meter, a rotational viscometer. The electrical stability and filter cake thickness of the drilling fluids were tested with other instruments described in the proceeding paragraphs.

The drilling fluids of Example 1 and the Comparative Fluid were aged by a dynamic high-temperature fluid aging technique, also called hot-rolling. This technique was conducted to assess the impact that temperatures greater than 250° F. have on performance. The drilling fluids were rolled under pressures of 150 pounds per square inch (psi) at 350° F. for 16 hours in an aging cell. The hot rolling in a pressurized system simulated the fluid under drilling conditions, and thereby aging it. By testing the viscosities, gel strengths, and other rheological properties of the drilling fluids before and after hot rolling, the results should indicate the ability of the drilling fluids to withstand the HPHT conditions in the wellbore.

The viscosities of the drilling fluid of Example 1 and the Comparative Fluid were measured at 120° F. in a rotational viscometer. The 350 mL of drilling fluid of Example 1 or the Comparative Fluid was placed in the Fann 35 heating cups and heated to 120° F. The drilling fluids of Example 1 and the Comparative Fluid were tested at the shear rates of 600, 300, 200, 100, 6, and 3 revolutions per minute (RPM) to determine the viscosities of each drilling fluid at a specific rate. This test was performed before and after hot rolling. Generally, a higher viscosity at a high shear rate would indicate that more energy would be required to move or pump the fluid. A drilling fluid having a lower viscosity at a high shear rate in a wellbore is more energy efficient.

The gel strength is the shear stress measured at a low shear rate after a drilling fluid has set quiescently for a period of time (usually 10 seconds and 10 minutes). The gel strength demonstrates the ability of a drilling fluid to suspend drill solid and weighting material when circulation in the wellbore ceases. The gel strengths of the drilling fluids were measured before and after hot rolling. The gel strengths of drilling fluids of Example 1 and the Comparative Fluid were tested at 10 seconds and 10 minutes in accordance to the American Petroleum Institute (API) Recommended Practice 13B-1, incorporated by reference into this disclosure in its entirety.

The plastic viscosity of a fluid is related to the resistance of that fluid to flow due to mechanical interactions between the components of the fluid. The plastic viscosity of a drilling fluid may be calculated by measuring the shear stress of the drilling fluid using a viscometer at shear rates of 5 Hz (300 RPM) and 10 Hz (600 RPM) and subtracting the 5 Hz viscosity from the 10 Hz viscosity as shown in Eq. (1).

$$PV = \text{(viscosity at 10 Hz)} - \text{(viscosity at 5 Hz)} \quad \text{Eq. (1)}$$

High shear rates are chosen for this calculation because the viscosity of Bingham plastic fluids exhibit more linear behavior at higher shear rates.

The yield point (YP) represents the minimum shear stress required to make a fluid flow. If a fluid is subjected to a shear stress less than the fluid's yield point, then the fluid will behave as a rigid body. If a fluid is subjected to a shear stress at or greater than the fluid's yield point, then the fluid will flow. The yield point is representative of a fluid's carrying capacity. A fluid with a greater yield point will be able to carry more mass. A drilling fluid with a greater yield point can carry a greater mass of formation cuttings. The yield point of a drilling fluid can be tailored for specific situations or specific types of formation cutting removal by altering the composition of the fluid.

The yield point of a fluid is determined by extrapolating the Bingham plastic rheology model to a shear rate of zero according to API Recommended Practice 13B-1. The yield point of a drilling fluid can be calculated from rheological data and the plastic viscosity according to Eq. (2).

$$YP = (\text{viscosity at 5 Hz}) - PV \qquad \text{Eq. (2)}$$

The yield point is expressed as a force per area, such as pounds of force per one hundred square feet (lbf/100 ft$^2$) or newtons per square meter (N/m$^2$). One pound of force per one hundred square feet is equal to about 4788 newtons per square meter (1 lbf/100 ft$^2$=4788 N/m$^2$).

The fluid loss (FL) test measures the filtration of a drilling fluid with ambient temperature and 100 psi differential pressure. When the drilling fluid has good fluid loss property, the result is a thin and impermeable mud cake. The API filtration test or fluid loss test was conducted on the drilling fluids of Example 1 and the Comparative Fluid after the aging technique by using a filtration apparatus (API filter press OFITE® apparatus). Each drilling fluid was placed into stainless steel chambers with an opening at the bottom. A filter paper was placed on the bottom and the mud was exposed to a pressure of 500 psi at 350° F. for 30 minutes (min) and the quantities of fluid collected were doubled when recorded (see Table 3). The results were doubled to create an adequate comparison with the low pressure test, which has a filter are twice the size of the high temperature and pressure filter press. The volume of the filtrate is double for HTHP oil-based much testing according to API standards.

The electrical stability of an oil-based drilling fluid is measured by applying a steadily increasing sinusoidal alternating voltage across a pair of parallel flat plate electrodes submerged in the oil-based drilling fluid. The resulting current will remain very low (less 5 µA for example) until a threshold voltage is reached. At the threshold, conduction between the two electrodes occurs, resulting in a rapid increase in current. When this current reaches 61 µA, the peak voltage is measured and reported as the electrical stability for the drilling fluid or other material. Electrical stability of an oil-based drilling fluid is influenced by factors such as the resistivity of the oil continuous phase, the conductivity of the non-continuous phase such as water and dissolved solids or salts, properties of suspended solids, temperature, droplet size, types of emulsifiers or additives, dielectric properties of the fluids, and shear history of the sample being tested. In general, an increase in the electrical stability voltage data is correlated with a greater emulsion stability.

The oil-based drilling fluids of Example 1 and Comparative Fluid were evaluated twice, before and after hot rolling, for viscosity, gel strength, plastic viscosity (PV), yield point (YP), and electrical stability (ES) according to the methods previously described. The first sets of measurements were recorded before hot rolling and provided in Table 2. The second sets of measurement were recorded after hot rolling and provided in Table 3.

TABLE 2

HPHT Oil-Based Drilling Fluids: Properties at Before Hot Rolling

| | | Example 1 | Comparative Fluid |
|---|---|---|---|
| Viscosity Centipoise (cP) | 600 RPM | 137 | 152 |
| | 300 RPM | 76 | 86 |
| | 200 RPM | 54 | 62 |
| | 100 RPM | 33 | 37 |
| | 6 RPM | 9 | 9 |
| | 3 RPM | 8 | 7 |
| 10 s gel strength (lbf/100 ft$^2$) | | 11 | 7 |
| 10 min gel strength (lbf/100 ft$^2$) | | 17 | 8 |
| PV (cP) | | 61 | 66 |
| YP (lbf/100 ft$^2$) | | 15 | 20 |
| ES (V) | | 1101 | 1173 |

TABLE 3

HPHT Oil-Based Drilling Fluids: Properties After Hot Rolling

| | | Example 1 | Comparative Fluid |
|---|---|---|---|
| Viscosity Centipoise (cP) | 600 RPM | 116 | 149 |
| | 300 RPM | 63 | 80 |
| | 200 RPM | 44 | 55 |
| | 100 RPM | 26 | 32 |
| | 6 RPM | 5 | 6 |
| | 3 RPM | 4 | 5 |
| 10 s gel strength (lbf/100 ft$^2$) | | 6 | 7 |
| 10 min gel (lbf/100 ft$^2$) | | 7 | 7 |
| PV (cP) | | 53 | 69 |
| YP (lbf/100 ft$^2$) | | 10 | 11 |
| ES (V) | | 911 | 402 |
| HPHT FL (mL) at 350° F. results doubled | | 3.6 | 6.8 |
| Filter cake thickness (mm) | | ~2.0-2.5 | ~2.5-3.0 |

The shear thinning data in Table 2 and Table 3 are correlated to the viscosity in the annuli during a drilling operation, where a less viscous fluid generally is more desirable than a more viscous fluid. The annulus of an oil well is any void between any piping, tubing or casing. The dial reading on the Fann 35 at a rotational speed of 100 RPM represents the viscosity in the annulus, and hence the Equivalent Circulating Density. As shown in Table 2 and Table 3, the drilling fluid of Example 1 had a viscosity less than that of the Comparative Fluid before and after hot rolling at 100 RPM. The viscosity of the drilling fluid of Example 1 was less than that of the Comparative Fluid at 600 RPM, 300 RPM, 200 RPM, 100 RPM, and 3 RPM. The viscosity after hot rolling of the drilling fluid of Example 1 was less than that the Comparative Fluid at 6 RPM after hot rolling. Thus, the drilling fluid of Example 1 was less susceptible to thermal breakdown than was the Comparative Fluid.

The gel strength of the drilling fluid of Example 1 after 11 seconds (s) was 10 lbf/100 ft$^2$ and after 10 minutes (min) was 17 lbf/100 ft$^2$ before hot rolling. After hot rolling, the gel strength decreased to about 7 lbf/100 ft$^2$ after 10 s and after 10 min. The gel strengths of the Comparative Fluid were consistently around 7 lbf/100 ft$^2$ after 10 s and after 10 minutes before and after hot rolling, indicating that both fluids are thermally stable.

The plastic viscosity (PV) of the drilling fluid of Example 1 was less than that of the Comparative Fluid. The Mg/Al LDH diamondoid compound in the drilling fluid of Example 1 is believed to be responsible for the decrease in PV.

As previously described, the yield point (YP) represents the stress or energy required to move the fluid. The YP for the drilling fluid of Example 1 was 15 cP before hot rolling and 10 cP after hot rolling. The YP for the Comparative Fluid was 20 cP before hot rolling and 11 cP after hot rolling. The decrease of the YP is attributed to the Mg/Al LDH diamondoid compound in the drilling fluid of Example 1.

The oil-based drilling fluid of Example 1 had a fluid loss at 350° F. of 3.6 mL (the results were doubled). The Comparative Fluid had a fluid loss of 6.8 mL (the results were doubled). The decrease of fluid loss was attributed to the rheology modifier, the Mg/Al LDH diamondoid compound.

The electrical stability data provide further evidence that the Mg/Al LDH diamondoid compound rheology modifier imparts stability to the drilling fluid not realized from the commercially available rheology modifier. The drilling fluid of Example 1 had electrical stability properties of 1101 V before hot rolling and 911 V after hot rolling, representing a decrease of about 17.3%. The electrical stability of the Comparative Fluid was 1173 V before hot rolling and 402 V after hot rolling, representing a decrease of about 65.7%. Before hot rolling, the Comparative Fluid was more electrically stable than the drilling fluid of Example 1. However, after simulated HPHT conditions or after hot rolling, the drilling fluid of Example 1 was considerably more stable than the Comparative Fluid and also maintained its electrical stability to a much greater extent than did the Comparative Fluid. Particularly, the difference in electrical stability between the drilling fluid of Example 1 and the Comparative Fluid was greater than 500 V. It is unexpected that the drilling fluid of Example 1 maintained a greater stability than the Comparative Fluid, since initially it was less stable than the Comparative Fluid. The greater electrical stability can be attributed to the Mg/Al LDH diamondoid compound in the drilling fluid of Example 1. Thus, the drilling fluid containing the Mg/Al LDH diamondoid compound had a better emulsion stability and was more electrically stable than the Comparative Fluid, which contained a commercial rheology modifier but otherwise identical ingredients such as base oil, brine, emulsifiers, a wetting agent, water, brine, fluid loss control additives, and a weight material.

The present disclosure is directed to at least one of the following aspects.

Aspect 1: An oil-based drilling fluid comprising: a base oil continuous phase comprising a base oil; an aqueous dispersed phase; and at least one rheology modifier comprising a magnesium/aluminum (Mg/Al) layered-double hydroxide (LDH) diamondoid compound.

Aspect 2: The oil-based drilling fluid of Aspect 1, in which the magnesium/aluminum (Mg/Al) layered-double hydroxide (LDH) diamondoid compound comprises: a general formula defined by $[Mg_{1-x}Al_x(OH)_2](A)_x \cdot mH_2O$, where x is from 0.2 to 0.5, m is from 0.33 to 0.50, and A is adamantane carboxylate; and an aspect ratio greater than 100, the aspect ratio defined by a width of the Mg/Al LDH diamondoid compound divided by a thickness of the Mg/Al LDH diamondoid compound.

Aspect 3: The oil-based drilling fluid of any of the previous aspects, in which the magnesium/aluminum double-layered hydroxide diamondoid compound is a magnesium/aluminum adamantane compound.

Aspect 4: The oil-based drilling fluid of any of the previous aspects, in which the base oil continuous phase comprises a base oil chosen from a synthetic oil comprising an ester or olefin, a diesel oil, or a mineral oil, in which the synthetic oil, the diesel oil, or the mineral oil comprises hydrocarbons chosen from n-paraffins, iso-paraffins, cyclic alkanes, branched alkanes, or mixtures of the hydrocarbons.

Aspect 5: The oil-based drilling fluid of any of the previous aspects, further comprising at least one additive chosen from emulsifiers, wetting agents, alkalinity control agents, fluid-loss control agents, suspending agents, weight-adjusting agents, density-adjusting agents, or combinations of the additives or, in the alternative, the oil-based drilling fluid of any of the previous aspects, further comprising at least one emulsifier, at least one wetting agent, at least one alkalinity control agent, at least one fluid-loss control agent, at least one suspending agent, and at least one density adjusting agent.

Aspect 6: The oil-based drilling fluid of any of the previous aspects, comprising from 0.1 wt. % to 1.0 wt. % rheology modifier, based on the total weight of the oil-based drilling fluid.

Aspect 7: The oil-based drilling fluid of any of the previous aspects, in which the aqueous dispersed phase contains a brine chosen from calcium chloride, calcium bromide, sodium chloride, sodium bromide, and combinations thereof.

Aspect 8: The oil-based drilling fluid of any of the previous aspects, comprising from 0.1 wt. % to 1.0 wt. % rheology modifier, based on the total weight of the oil-based drilling fluid.

Aspect 9: The oil-based drilling fluid of any of the previous aspects, comprising, based on the total weight of the oil-based drilling fluid from 10 wt. % to 17 wt. % base oil.

Aspect 10: The oil-based drilling fluid of any of the previous aspects, comprising, based on the total weight of the oil-based drilling fluid from 0.5 wt. % to 2.0 wt. % emulsifier.

Aspect 11: The oil-based drilling fluid of any of the previous aspects, comprising, based on the total weight of the oil-based drilling fluid from 0.2 wt. % to 0.6 wt. % wetting agent.

Aspect 12: The oil-based drilling fluid of any of the previous aspects, comprising, based on the total weight of the oil-based drilling fluid from 0.2 wt. % to 1.0 wt. % rheology modifier.

Aspect 13: The oil-based drilling fluid of any of the previous aspects, comprising, based on the total weight of the oil-based drilling fluid from 0.5 wt. % to 1.5 wt. % fluid-loss control additive.

Aspect 14: The oil-based drilling fluid of any of the previous aspects, comprising, based on the total weight of the oil-based drilling fluid from 2.5 wt. % to 5.0 wt. % brine solution.

Aspect 15: The oil-based drilling fluid of any of the previous aspects, comprising, based on the total weight of the oil-based drilling fluid from 65.0 wt. % to 78.0 wt. % weighting additive.

Aspect 16: A method for preparing an oil-based drilling fluid, the method comprising: mixing a base oil, optionally an emulsifier, and optionally a wetting agent to form a first mixture; and mixing an aqueous dispersed phase and at least one rheology modifier into the first mixture to form an oil-based drilling fluid, the at least one rheology modifier comprising a layered-double hydroxide magnesium/aluminum-diamondoid compound.

Aspect 17: The method of Aspect 16, further comprising: adding at least one fluid-loss control additive into the oil-based drilling fluid.

Aspect 18: The method of any of Aspects 16 or 17, further comprising: adding a brine solution into the oil-based drilling fluid.

Aspect 19: The method of any of Aspects 16 to 18, further comprising: adding a weighting additive into the oil-based drilling fluid.

Aspect 20: The method of any of Aspects 16 to 19, further comprising preparing the magnesium/aluminum layered double hydroxide diamondoid compound by: mixing a magnesium salt, an aluminum salt, a solvent, and a diamondoid compound having at least one carboxylic acid moiety to form a reactant mixture; and heating the reactant mixture at a reaction temperature for a reaction time to form the magnesium/aluminum layered double hydroxide diamondoid compound.

Aspect 21: The method of any of Aspects 16 to 20, in which the magnesium salt and the aluminum salt are mixed in amounts that provide a molar ratio of magnesium to aluminum in the reaction mixture of from 0.5:1 to 6.0:1.

Aspect 22: The method of any of Aspects 16 to 21, in which the aluminum salt and the diamondoid compound are mixed in amounts that provide a molar ratio of aluminum to diamondoid compound in the reaction mixture of from 0.5:1 to 2.0:1.

Aspect 23: The method of any of Aspects 16 to 22, in which the aluminum salt is $Al(OH)_3$.

Aspect 24: The method of any of Aspects 16 to 23, in which the magnesium salt is $Mg(OH)_2$.

Aspect 25: The method of any of Aspects 16 to 24, in which the diamondoid compound is 1-adamantane carboxylic acid.

Aspect 26: The method of any of Aspects 16 to 25, in which the magnesium/aluminum layered double hydroxide diamondoid compound is derived from $Mg(OH)_2$, $Al(OH)_3$, and 1-adamantane carboxylic acid.

Aspect 27: The method of any of Aspects 16 to 26, in which the reaction temperature is from 100° C. to 180° C.

Aspect 28: The method of any of Aspects 16 to 27, in which the reaction temperature is from 140° C. to 160° C.

Aspect 29: The method of any of Aspects 16 to 28, in which the reaction time is at least 12 hours.

Aspect 30: The method of any of Aspects 16 to 29, in which the base oil continuous phase comprises a base oil chosen from a synthetic oil comprising an ester or olefin, a diesel oil, or a mineral oil, in which the synthetic oil, the diesel oil, or the mineral oil comprises hydrocarbons chosen from n-paraffins, iso-paraffins, cyclic alkanes, branched alkanes, or mixtures thereof.

Aspect 31: The method of any of Aspects 16 to 30, comprising from 0.1 wt. % to 1.0 wt. % rheology modifier, based on the total weight of the oil-based drilling fluid.

Aspect 32: The method of any of Aspects 16 to 31, in which the brine solution is chosen from calcium chloride, calcium bromide, sodium chloride, sodium bromide, and combinations thereof.

Aspect 33: The method of any of Aspects 16 to 32, comprising, based on the total weight of the oil-based drilling fluid from 13 wt. % to 17 wt. % base oil.

Aspect 34: The method of any of Aspects 16 to 33, comprising, based on the total weight of the oil-based drilling fluid from 0.2 wt. % to 2.0 wt. % emulsifier.

Aspect 35: The method of any of Aspects 16 to 34, comprising, based on the total weight of the oil-based drilling fluid from 0.1 wt. % to 1.0 wt. % wetting agent.

Aspect 36: The method of any of Aspects 16 to 35, comprising, based on the total weight of the oil-based drilling fluid from 0.2 wt. % to 1.0 wt. % rheology modifier.

Aspect 37: The method of any of Aspects 16 to 36, comprising, based on the total weight of the oil-based drilling fluid from 0.5 wt. % to 1.5 wt. % fluid-loss control additive Aspect 38: The method of any of Aspects 16 to 37, comprising, based on the total weight of the oil-based drilling fluid from 2.0 wt. % to 6.0 wt. % brine solution.

Aspect 39: The method of any of Aspects 16 to 38, comprising, based on the total weight of the oil-based drilling fluid from 65 wt. % to 78 wt. % weighting additive.

Aspect 40: An oil-based drilling fluid prepared according to the method of any of Aspects 16 to 39.

Aspect 41: A method for drilling in a subterranean well, the method comprising: operating a drill in a wellbore in the presence of an oil-based drilling fluid comprising: a base oil; at least one additive chosen from an emulsifier, a weighting material, a fluid-loss additive, a viscosifiers, or an alkali compound; and from 0.1 wt. % to 1 wt. %, based on the total weight of the drilling fluid, of a magnesium/aluminum adamantane layered double hydroxide compound.

Aspect 42: The method of Aspect 41, further comprising adding the magnesium/aluminum layered double hydroxide diamondoid compound to the oil-based drilling fluid before or during operating the drill in the wellbore.

Aspect 43: The method of any of Aspects 41 or 42, further comprising adding the magnesium/aluminum layered double hydroxide diamondoid compound to the oil-based drilling fluid during operating the drill in the wellbore.

Aspect 44: The method of any of Aspects 41 to 43, in which the oil-based drilling fluid is stable under high-pressure high-temperature conditions during drilling operations comprising a wellbore pressure greater than 10,000 psi and a wellbore temperature greater than 300° F.

Aspect 45: The method of any of Aspects 41 to 44, in which the oil-based drilling fluid has an electrical stability of from 900 V to 1170 V and a 10-second gel strength of from 1 lbf/100 ft$^2$ to 10 lbf/100 ft$^2$ as determined according to test methods provided in API RP 13B-1.

Aspect 46: The method of any of Aspects 41 to 45, in which the oil-based drilling fluid with the rheology modifier, under high-pressure high-temperature conditions, has lower viscosity, compared to a drilling fluid having an identical specific gravity and oil-to-water ratio and identical ingredients in identical proportions to the oil-based drilling fluid but lacking the rheology modifier.

Aspect 47: The method of any of Aspects 41 to 46, in which the oil-based drilling fluid with the rheology modifier, under high-pressure high-temperature conditions, has a lower fluid loss, compared to a drilling fluid having an identical specific gravity and oil-to-water ratio and identical ingredients in identical proportions to the oil-based drilling fluid but lacking the rheology modifier.

Aspect 48: An oil-based drilling fluid prepared according to the method of any of Aspects 41 to 47, in which the oil-based drilling fluid with the rheology modifier, under high-pressure high-temperature conditions, has higher electrical stability, compared to a drilling fluid having an identical specific gravity and oil-to-water ratio and identical ingredients in identical proportions to the oil-based drilling fluid but lacking the rheology modifier.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. An oil-based drilling fluid comprising:
   a base oil continuous phase comprising a base oil;
   an aqueous dispersed phase; and
   at least one rheology modifier comprising a magnesium/aluminum (Mg/Al) layered-double hydroxide (LDH) diamondoid compound.

2. The oil-based drilling fluid of claim 1, in which the magnesium/aluminum (Mg/Al) layered-double hydroxide (LDH) diamondoid compound comprises:
   a general formula defined by $[Mg_{1-x}Al_x(OH)_2](A)_x \cdot mH_2O$, where x is from 0.2 to 0.5, m is from 0.33 to 0.50, and A is adamantane carboxylate; and
   an aspect ratio greater than 100, the aspect ratio defined by a width of the Mg/Al LDH diamondoid compound divided by a thickness of the Mg/Al LDH diamondoid compound.

3. The oil-based drilling fluid of claim 1, in which the magnesium/aluminum double-layered hydroxide diamondoid compound is a magnesium/aluminum adamantane compound.

4. The oil-based drilling fluid of claim 1, in which:
   the base oil is selected from the group consisting of an ester-containing synthetic oil, an olefin-containing synthetic oil, a diesel oil, and a mineral oil, and
   the ester-containing synthetic oil, the olefin-containing synthetic oil, the diesel oil, and the mineral oil comprises hydrocarbons selected from the group consisting of n-paraffins, iso-paraffins, cyclic alkanes, branched alkanes, and mixtures thereof.

5. The oil-based drilling fluid of claim 1, further comprising at least one additive selected from the group consisting of emulsifiers, wetting agents, alkalinity control agents, fluid-loss control agents, suspending agents, weight-adjusting agents, density-adjusting agents, and combinations thereof.

6. The oil-based drilling fluid of claim 1, comprising from 0.1 wt. % to 1.0 wt. % of the at least one rheology modifier, based on the total weight of the oil-based drilling fluid.

7. The oil-based drilling fluid of claim 1, in which the aqueous dispersed phase contains a brine comprising at least one salt selected from the group consisting of calcium chloride, calcium bromide, sodium chloride, sodium bromide, and combinations thereof.

8. A method for drilling in a subterranean well, the method comprising: operating a drill in a wellbore in the presence of the oil-based drilling fluid according to claim 1.

9. The method of claim 8, in which the oil-based drilling fluid is stable under high-pressure high-temperature conditions during drilling operations at a wellbore pressure greater than 10,000 psi and a wellbore temperature greater than 300° F.

10. A method for preparing an oil-based drilling fluid, the method comprising:
    mixing an aqueous dispersed phase and at least one rheology modifier into an oil phase to form an oil-based drilling fluid, the at least one rheology modifier comprising a layered-double hydroxide magnesium/aluminum-diamondoid compound, the oil phase comprising a base oil and at least one of an emulsifier and a wetting agent.

11. The method of claim 10, further comprising adding into the oil-based drilling fluid at least one of a brine solution, a weighting additive, or a fluid-loss control additive.

12. The method of claim 10, in which:
    the base oil is selected from the group consisting of an ester-containing synthetic oil, an olefin-containing synthetic oil, a diesel oil, and a mineral oil, and
    the ester-containing synthetic oil, the olefin-containing synthetic oil, the diesel oil, and the mineral oil comprises hydrocarbons selected from the group consisting of n-paraffins, iso-paraffins, cyclic alkanes, branched alkanes, and mixtures thereof.

13. The method of claim 10, comprising from 0.1 wt. % to 1.0 wt. % of the at least one rheology modifier, based on the total weight of the oil-based drilling fluid.

14. The method of claim 10, further comprising adding into the oil-based drilling fluid a brine solution, in which the brine solution comprises at least one salt selected from the group consisting of calcium chloride, calcium bromide, sodium chloride, sodium bromide, and combinations thereof.

15. An oil-based drilling fluid prepared according to the method of claim 10.

16. The method of claim 10, further comprising preparing the magnesium/aluminum layered double hydroxide diamondoid compound by:
    mixing a magnesium salt, an aluminum salt, a solvent, and a diamondoid compound having at least one carboxylic acid moiety to form a reactant mixture; and
    heating the reactant mixture at a reaction temperature for a reaction time to form the magnesium/aluminum layered double hydroxide diamondoid compound.

17. The method of claim 16, in which the magnesium/aluminum layered double hydroxide diamondoid compound is derived from $Mg(OH)_2$, $Al(OH)_3$, and 1-adamantane carboxylic acid.

18. The method of claim 16, in which the reaction temperature is from 100° C. to 180° C.

19. The method of claim 16, in which the reaction time is at least 12 hours.

* * * * *